Patented May 29, 1945

2,377,057

UNITED STATES PATENT OFFICE 2,377,057

PREPARING LEVIGATED ALUMINA FOR STORING IN WATER SUSPENSION

Joseph R. Vilella, New York, N. Y., assignor to United States Steel Corporation of Delaware, a corporation of Delaware No Drawing. Application March 25, 1942, Serial No. 436,195

4 Claims. (Cl. 23—141)

This invention is concerned with the problem of storing levigated alumina in a water solution so that it can be conveniently used when desired for extremely fine polishing purposes; particularly, for the polishing of metallographic specimens. The problem arises from the fact that prior to the present invention, it was impossible to produce a water suspension of levigated alumina of the necessary fineness, which was not subject to the objection that the alumina would settle to the bottom of the water upon storing of the suspension, so as to produce a hard cake which could not easily be returned to suspension in spite of vigorous agitation. Because of this difficulty, metallographers have in the past purchased this material in bottled form from Germany where, by a secret art, it was produced free from the objectionable caking described. The need for enabling the domestic production of this material is particularly apparent at the present time.

According to the present invention, as it is specifically practiced, hydrated alumina is placed loosely, without hard packing, to a depth of about two inches in an oxidation-resistant metal container and heated for two hours at 1850° F. The powder, when cooled, is transferred to a glass vessel and shaken with water to which a few drops of phenolphthalein has been added in the proportion of from 100-150 g. of powder per 1000 cc. of water. At this stage the suspension is strongly alkaline and each particle of alumina floats in the water as a single unit; that is to say, there is no tendency for the particles to agglomerate. As is well known, hydrated alumina contains an alkali, resulting from its manufacture, which cannot be driven off by heating, this accounting for the alkalinity of the suspension. It is this type of hydrated alumina with which this invention is concerned. Because the particles are unagglomerated, the coarser ones settle to the bottom quickly, while the finer ones remain in suspension for a longer time, depending on their fineness. The previously described heating need not be carried out at the exact time and temperature described, but it should be sufficient to condition the alumina so that it acts in the water as just described. That is to say, the hydrated alumina must be converted to alumina. The milky liquid, containing all the particles which have not settled in 15 minutes, is syphoned out in a clean vessel, without agitation of the mixture such as might disturb the settled, coarser particles. The coarse sediment remaining represents approximately 25% by weight of the alumina initially mixed in the water, this sediment being discarded.

At this stage the separated milky liquid represents a suspension of levigated alumina which may be used for metallurgical polishing, but when it is stored for any length of time without being disturbed, the alumina suspension settles to form a hard cake which it is difficult or impossible to break up again by agitation, such as by vigorously shaking a bottle of the material.

However, according to the invention, before such a cake forms, the suspension is substantially neutralized with acid, the amount added, drop by drop, being just insufficient to decolorize the phenolphthalein, this acting as an indicator. When the suspension has been thus neutralized, or very nearly neutralized, the alumina particles agglomerate to form a curd very similar to curdled milk. In this condition the individual alumina particles no longer behave as units, but settle, upon long standing, as a mass, irrespective of their relative fineness. The suspension in this condition does not cake when stored for long periods without agitation. In every respect it is the equal of the material formerly obtainable only from Germany.

To reduce the bulk of the material, the clear liquid, which ultimately separates on standing, may be syphoned off until the suspension reaches a concentration of approximately 200 g. of alumina per 1000 cc. of water. This stock material is diluted with from 20-30 parts of water as it is needed for use in the polishing of metallographic specimens.

The material produced by this invention has been found satisfactory for polishing all grades of steel, and does not produce scratches visible even at high magnifications. A finer suspension may be required for softer metals, such as pure aluminum or lead, it being understood that the longer the initial water mixture of the alumina stands, the greater will be the separation of the coarser particles from the finer particles. However the 15 minute suspension described herein, is very satisfactory for use with steel specimens.

I claim:

1. A method of preparing levigated alumina for storing in water suspension, comprising heating hydrated alumina to convert it to alumina, said hydrated alumina containing an alkali resulting from the manufacture which cannot be driven off by heating, mixing this alumina when cool with water and allowing the mixture to stand, for a time permitting the coarser alumina particles to settle to the desired degree while the finer particles remain in suspension in the upper portion of the mixture, without agitating the mixture removing its upper portion with the suspension of the finer particles, and substantially neutralizing the removed upper portion with acid to agglomerate its suspension of the finer alumina particles to prevent their caking upon storing.

2. A method of preparing levigated alumina for storing in water suspension, comprising heating hydrated alumina to convert it to alumina, said hydrated alumina containing an alkali resulting from the manufacture which cannot be driven off by heating, mixing this alumina when cool with water and allowing the mixture to stand, for a time permitting the coarser alumina particles to settle to the desired degree while the finer particles remain in suspension in the upper portion of the mixture, without agitating the mixture removing its upper portion with the suspension of the finer particles, and substantially neutralizing the removed upper portion with acid to agglomerate its suspension of the finer alumina particles to prevent their caking upon storing, the initial mixture being colored with phenolphthalein and the acid used to neutralize the removed upper portion being hydrochloric acid added so as to just remove its color.

3. A method of preparing levigated alumina for storing in water suspension, comprising heating hydrated alumina containing an alkali resulting from the manufacture which cannot be driven off, to a temperature of around 1850° F. for a time of about 2 hours to convert it to alumina, mixing this alumina when cool with water colored with phenolphthalein and allowing the mixture to stand for a time permitting the coarser alumina particles to settle to the desired degree while the finer particles remain in suspension in the upper portion of the mixture, without agitating the mixture removing its upper portion with the suspension of finer particles, and adding hydrochloric acid to the removed upper portion so as to just remove its color and substantially neutralize it to agglomerate its suspension of the finer alumina particles to prevent their caking upon storing.

4. A method of preparing levigated alumina for storing in water suspension, comprising heating hydrated alumina containing an alkali resulting from the manufacture which cannot be driven off, while loosely placed in a container to a temperature of around 1850° F. for a time of about 2 hours to convert it to alumina, mixing this alumina when cool with water colored with phenolphthalein and allowing the mixture to stand for about 15 minutes so that about 25% by weight of the alumina originally mixed with the water settles as coarser particles while the remainder remains as finer particles in suspension in the upper portion of the mixture, without agitating the mixture removing its upper portion with the suspension of finer particles, and adding hydrochloric acid to the removed upper portion so as to just remove its color and substantially neutralize it to agglomerate its suspension of the finer alumina particles to prevent their caking upon storing.

JOSEPH R. VILELLA.